(12) United States Patent
Golec et al.

(10) Patent No.: US 9,838,862 B2
(45) Date of Patent: Dec. 5, 2017

(54) MOBILE DIGITAL CELLULAR TELECOMMUNICATION SYSTEM WITH ADVANCED FUNCTIONALITY FOR RATING CORRECTION

(71) Applicant: SAP SE, Walldorf (DE)

(72) Inventors: Adrian Golec, Schwetzingen (DE);
Georg Lang, Ludwigshafen (DE);
Artur Kaufmann, Landau (DE)

(73) Assignee: SAP SE, Walldorf (DE)

( * ) Notice: Subject to any disclaimer, the term of this patent is extended or adjusted under 35 U.S.C. 154(b) by 108 days.

(21) Appl. No.: 15/042,210

(22) Filed: Feb. 12, 2016

(65) Prior Publication Data

US 2016/0366575 A1 Dec. 15, 2016

(30) Foreign Application Priority Data

Jun. 10, 2015 (EP) .................................... 15171310

(51) Int. Cl.
| | |
|---|---|
| *H04Q 7/10* | (2006.01) |
| *H04W 4/26* | (2009.01) |
| *H04L 12/14* | (2006.01) |
| *H04M 15/00* | (2006.01) |
| *H04W 76/02* | (2009.01) |

(52) U.S. Cl.
CPC ........... *H04W 4/26* (2013.01); *H04L 12/1428* (2013.01); *H04L 12/1432* (2013.01); *H04L 12/1482* (2013.01); *H04M 15/41* (2013.01); *H04M 15/60* (2013.01); *H04W 76/02* (2013.01); *H04L 12/1435* (2013.01); *H04L 12/1457* (2013.01)

(58) Field of Classification Search
CPC ......... H04W 4/26; H04W 4/24; H04M 15/41; H04M 15/60; H04M 15/61; H04L 12/1482; H04L 12/1428
See application file for complete search history.

(56) References Cited

U.S. PATENT DOCUMENTS

| | | | |
|---|---|---|---|
| 5,197,002 A | 3/1993 | Spencer | |
| 9,241,079 B1 * | 1/2016 | Cai | ..................... H04M 15/885 |
| 2002/0143716 A1 | 10/2002 | Byrne et al. | |
| 2015/0181415 A1 * | 6/2015 | Raleigh | ................... H04W 8/22 455/418 |

FOREIGN PATENT DOCUMENTS

| | | |
|---|---|---|
| WO | WO 2009/092852 | 7/2009 |
| WO | WO2012041149 | 4/2012 |

* cited by examiner

*Primary Examiner* — Kathy Wang-Hurst
*Assistant Examiner* — Julio Perez
(74) *Attorney, Agent, or Firm* — Harness, Dickey & Pierce, P.L.C.

(57) ABSTRACT

A mobile digital telecommunication system, a computer-implemented method, and a computer readable medium having stored thereon a computer executable program code for processing of usage detail records (UDRs) is disclosed herein. The mobile digital cellular telecommunication system comprises a network component configured to generate the UDRs, a rating system and a billing system.

16 Claims, 7 Drawing Sheets

---

240

211c. Receive a request to correct the invoice record, the request comprising an instruction to repeat the generation of the invoice record according to another one of the convergent billing rules

↓

207b. Generation corrected invoice record according to the another one of the convergent billing rules

230 ⇘

| 211b. Receive a request to correct the invoice record, the request comprising an instruction to repeat the generation of the charge amounts generated in one of the previously executed batches according to another cumulative charging rule |

| 221c. Recover complete data volume of the usage data in each of the records which charge amount is previously generated in said batch |

| 222c. Repeat the generating of the charge amounts in said batch according to the another cumulative charging rule |

| 222b. Substitute the previously generated charge amounts in the respective records with the newly generated charge amounts |

| 206c. Reduce data volume of the usage data in each of the data records which charge amounts were generated in said batch |

| 211c. Receive a request to correct the invoice record, the request comprising an instruction to repeat the generation of the invoice record according to another one of the convergent billing rules |

| 207b. Generation corrected invoice record according to the another one of the convergent billing rules |

FIG. 9

MOBILE DIGITAL CELLULAR TELECOMMUNICATION SYSTEM WITH ADVANCED FUNCTIONALITY FOR RATING CORRECTION

TECHNICAL FIELD

This disclosure relates to telecommunications processing systems. In particular, this invention relates to a flexible and efficient correction of determined charge amounts for a diverse array of telecommunications.

BACKGROUND

In telecommunications, rating is an activity that determines the cost of chargeable events, such as a cost of service usage, a telephone call, a text message, a data download, a purchase, and the like. Rating may also be performed with regard to other services, such as radio-monitored toll ways, public transit, and the like. Telecommunication access points, turnstiles, and other access points for chargeable events typically generate usage data, in the form of Usage Detail Records (UDR). Examples of UDRs include Call Detail Records (CDR), Event Detail Records (EDR), and Internet Protocol Detail Records (IPDR). UDRs are sent to, or retrieved by, a data processing system. The data processing system further performs rating of the UDRs and generates invoices comprising charge amounts related to previously rated UDRs.

To date, rating of UDRs and providing rated event data to an invoicing process has been linear in nature. Execution of these processes is optimized for automated processing the UDRs in accordance with the aforementioned sequence of processing steps. On the other hand, when there is a need for a correction of a generated invoice, the correction is as usual performed manually by an operator. Performing of the corrections in this way may compromise the automated processing of the UDRs, since automated processes and user operated process are difficult to combine in a non-contradicting manner.

SUMMARY

A pipeline batch processing system, as understood here, is a data processing system configured to perform pipeline processing of data records according to a sequence of chained processes, wherein at least one of the processes is configured to enable batch processing of pluralities of the data records.

The invention generally describes computer-implemented methods, computer-readable media, and mobile digital cellular telecommunication systems for correction of processing transactions such as call detail records (CRDs). The CDRs relate to different resources which are used by customers. The CDRs may have different types, CDRs of one type can comprise descriptions of internet connections established by users via their mobile terminals (e.g. smartphones), CDRs of another type can comprise descriptions of telephone calls made by users, CDRs of yet another type can comprise descriptions of short message services (SMSs) sent by users, and CDRs of further types can comprise descriptions of many other services available to the users in the digital cellular telecommunication networks. The rating of CDRs may be quite complex, it may depend on overall usage of particular resource, or on overall usage of all used resources by a particular user or a group of users resources. On top of this, resource providers may apply loyalty program rules which affect overall billing/invoicing of the consumed resources at an end of a billing cycle or upon a special rating request to rate a prepaid or a postpaid account. As a result thereof not only the rating-billing scheme but procedures for correcting of the generated invoices/bills get quite complex and may demand extra resources. These resources may be quite expensive, thus there is a need for development of an automated processing of CDRs resulting in generation of invoices based on the rating of the CDRs in conjunction with development of the procedures enabling correction of the generated invoices without compromising of the generation of the new invoices.

As it will be clearly seen from the following description the generation of the new invoices is based on an automated sequence of procedures which enable parallel and/or batch processing of the CDRs stored in a database as records, moreover data volume of data records can be reduced throughout the processing of the record. For instance, data stored in the record which is redundant for further processing of the record, can be deleted in the record and stored in another data record. As a result thereof every next processing step processes records having smaller data volume. In order to minimize the impact of invoice corrections on the generation of the new invoices the procedures for the executing of the corrections are based on the same procedures as generation of the new invoices. Further, a special indexing scheme for identification of the data records in the database is developed for fast and safe processing of the database records in processes related to the generation of the new invoices and at the same time in the processes related to the correction of the generated invoices. The indexing scheme is based on primary keys, secondary keys, and foreign keys comprised in the record. The primary key is used for unique identification of the record in the database, i.e. each of the primary keys is comprised in only one respective record. The secondary keys are used for identification of groups of the records, i.e. the secondary key is used for identification of the records of the group, wherein each of the records of the group comprises the secondary key. The foreign keys are used for establishing foreign key relationships between the records in the database. For instance, this way of data storage organization when the data being redundant for the next processing step is deleted in the record, the deleted data can be stored in an auxiliary data record being linked by a foreign key relationship with the record in which the data is deleted.

According to one embodiment, the present invention relates to a telecommunication method in a mobile digital cellular telecommunication system. The method comprises the following being executed by a network component of the mobile digital cellular telecommunication system: establishing a connection with a remote terminal via the digital cellular telecommunication network; providing a resource on the remote terminal via the established connection; and sending a usage message to a pipeline batch processing system of the mobile digital cellular telecommunication system, the usage message comprising usage data related to a usage of the resource provided on the remote terminal. The pipeline batch processing system is a data processing system configured to perform pipeline processing of data records according to a sequence of chained processes. The method further comprises the following being executed by the pipeline batch processing system: receiving the usage messages; converting the received usage message into a record in a database of the mobile digital cellular telecommunication system, the record comprising the usage data, a primary key, and one or more secondary keys, wherein the primary keys are used for unique identification of the records in the database and the secondary keys are used for identification of groups of the records in the database; generating charge amounts for the usages of the respective resources which usage data are comprised in the records comprising one or more of the secondary keys of a first key set; adding the generated charge amount to the respective record; generating an invoice record in the database, the invoice record comprising: the primary keys comprised in the records comprising one or more of the secondary keys of a second key set, charge amounts comprised in the records comprising one or more of the secondary keys of the second key set, and the usage data comprised in the records comprising one or more of the secondary keys of the second key set; receiving a request to correct the invoice record from a controlling component of the mobile digital cellular telecommunication system, the request comprising a correction specification of the respective usage data comprised in the invoice record; correcting the usage data in the record comprising the usage data to be corrected, wherein the usage data is corrected according the correction specification; correcting the charge amount in the record comprising the corrected usage data; generating a corrected invoice record in the database, the corrected invoice record comprising: primary keys comprised in the invoice record, the corrected charge amounts comprised in the records comprising the primary keys comprised in the invoice record, and the corrected usage data comprised in the records comprising the primary keys comprised in the invoice record.

This way of identification of the records for generation of the invoice record and the corrected invoice record enables safe/error free generation of the corrected invoice record. During generation of the invoice record the records are selected according to the secondary keys, for instance these can be types of usage messages, identifications of users who have used the resources, or resource identifications. For instance the first set of the secondary keys can be a type of the usage messages (e.g. type of CDRs) and a user identification. When this set is used the charge amounts for CDRs of one type (e.g. voice communication) for one user are rated. The second set can comprise only the user identification. When this set is used the invoice record for the user is generated, the invoice record comprises information regarding various resources used by the users and their respective charges. This way of assignment of secondary keys can enable the effective querying of the database for the records required for execution of particular step of generation of the invoice record. However, the corrected invoice record comprises the same primary keys as the previously generated invoice record. This constraint can ensure, that the corrected invoice is related to the same usage messages as the previously generated invoice record. When this constraint is not fulfilled, then there is a risk that the corrected invoice record is based on a different set of the usage messages. As a result thereof it may be quite difficult to validate whether the corrected invoice record is finally correct. In addition, when several invoice records are corrected at the same time (in parallel), the correction of one invoice record may cause addition of new records during the process of correction of another invoice records. These hidden cascaded changes may make correction of the invoice records very complicated and even cause cascades of unexpected/uncontrolled corrections.

According to another embodiment, the present invention relates to a telecommunication method in a mobile digital cellular telecommunication system. The method comprises the following: receiving a usage message on a pipeline batch processing system from a network component, the usage message comprising usage data related to a usage of a resource provided on a remote terminal by the network component, wherein the pipeline batch processing system is a data processing system configured to perform pipeline processing of data records according to a sequence of chained processes; converting the received usage message into a record in a database of the mobile digital cellular telecommunication system, the record comprising the usage data; generating charge amounts for the usages of the respective resources; adding the generated charge amount to the respective record, wherein the adding of the generated charge amount to the respective record comprises the following being executed on the record to which the charge amount is added: reducing data volume of the usage data in the record; generating an invoice record in the database, the invoice record comprising charge amounts and their respective usage data; receiving a request to correct the invoice record from a controlling component of the mobile digital cellular telecommunication system, the request comprising a correction specification of the respective usage data comprised in the invoice record; recovering a complete data volume of the usage data in the record comprising the usage data to be corrected; after the recovering of the complete data volume of the usage data in the record comprising the usage data to be corrected correcting the usage data in the record comprising the usage data to be corrected, wherein the usage data is corrected ac-cording the correction specification; correcting the charge amount in the record comprising the corrected usage data; after the correcting of the charge amount in the record comprising the corrected usage data executing the following on the record comprising the corrected usage data: the reducing of data volume of the usage data in the record; generating a corrected invoice record in the database, the corrected invoice record comprising the corrected charge amounts and the corrected usage data.

This way of data handling can accelerate data processing and/or reduce the amount of computer resources required therefore, because the data volume of the usage data is reduced in "forward" processing of the record, i.e. generation of the invoice record. The redundant information (i.e. information which is no longer needed for further processing of the record) is stored in the auxiliary record, which is used in "reverse" processing of the record, i.e. when the repetition of the previously executed process step is required for error correction. Effect of reduction of data volume to be processed throughout the process of the generation of the invoice record can surpass effect of the need to merge the records in the process of the correction of the invoice record, because in a properly operating system the invoice records to be corrected are only a small portion of an overall amount of the generated invoice record. The positive effect of the surpassing can be precious when in-memory database is used for processing of the records. The records can be stored in the main memory of the computer system, wherein the in-memory database is allocated, while the auxiliary records can be stored on a hard disk drive (HDD).

According to another embodiment, the present invention relates to a computer readable medium having stored thereon a computer executable code for execution by computer processors controlling a mobile digital cellular telecommunication system, wherein execution of the instructions of the executable code causes the computer processors to execute the telecommunication method of any of the aforementioned embodiments.

According to one embodiment, the present invention relates to a mobile digital cellular telecommunication system comprising a pipe line batch processing system, a controlling component, and a database. The pipeline batch processing system is a data processing system configured to perform pipeline processing of data records according to a sequence of chained processes. The network component is configured to perform the following: establishing a connection with a remote terminal via the digital cellular telecommunication network; providing a resource on the remote terminal via the established connection; and sending a usage message to a pipeline batch processing system, the usage message comprising usage data related to a usage of the resource provided on the remote terminal. The pipeline batch processing system is configured to perform the following: receiving usage messages; converting the received usage message into a record in a database of the mobile digital cellular telecommunication system, the record comprising the usage data, a primary key, and one or more secondary keys, wherein the primary keys are used for unique identification of the records in the database and the secondary keys are used for identification of groups of the records in the database; generating charge amounts for the usages of the respective resources which usage data are comprised in the records comprising one or more of the secondary keys of a first key set; adding the generated charge amount to the respective record; generating an invoice record in the database, the invoice record comprising: the primary keys comprised in the records comprising one or more of the secondary keys of a second key set, charge amounts comprised in the records comprising one or more of the secondary keys of the second key set, and the usage data comprised in the records comprising one or more of the secondary keys of the second key set; receiving a request to correct the invoice record from the controlling component, the request comprising a correction specification of the respective usage data comprised in the invoice record; correcting the usage data in the record comprising the usage data to be corrected, wherein the usage data is corrected according the correction specification; correcting the charge amount in the record comprising the corrected usage data; generating a corrected invoice record in the database, the corrected invoice record comprising: primary keys comprised in the invoice record, the corrected charge amounts comprised in the records comprising the primary keys comprised in the invoice record, and the corrected usage data comprised in the records comprising the primary keys comprised in the invoice record.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

FIG. 8. shows a block flow diagram.

FIG. 9. shows a block flow diagram.

DETAILED DESCRIPTION

Figure 1:
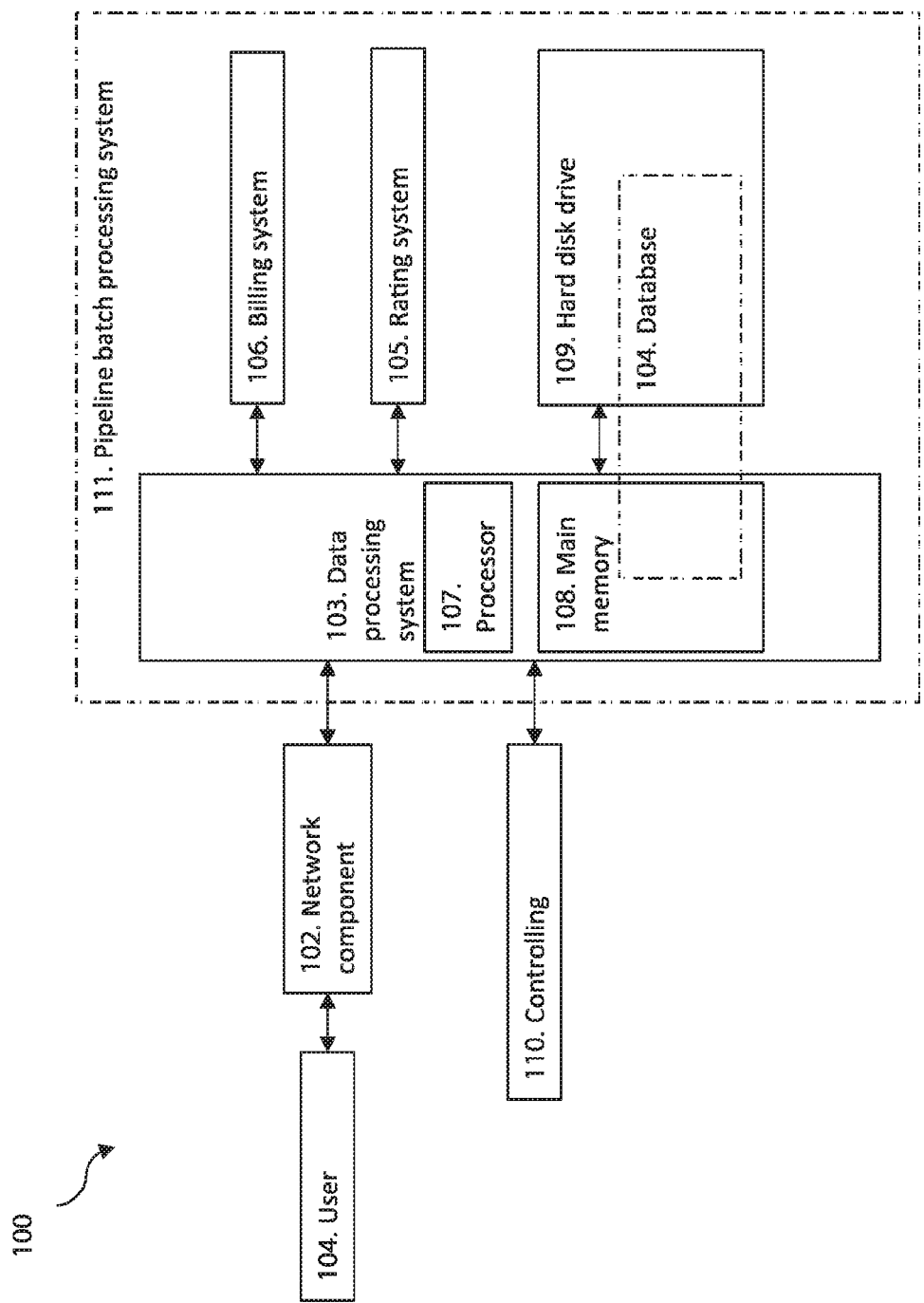
FIG. 1 shows a block diagram illustrating an example environment for processing usage detail records.

Various embodiments herein each include at least one of systems, methods, and software that operate to provide flexible UDR rating solutions. Some such solutions include embodiments that allow for billing system, such as the Convergent Billing product available from SAP AE of Waldorf, Germany, to receive and process data from one to many different instances and types procured from multiple vendors or as may have been custom developed. An example of such a rating system is the Convergent Charging system, also available form SAP AE.

These solutions are very well adapted to service modern service providers, such as telecommunications service providers, that have seen considerable consolidation in recent years while also expanding their service offerings beyond landline-based telephone service and into wireless voice and data service, wired and wireless internet service, sales of media, and mobile payments, among others. For example, each entity that has been consolidated into a single company may have a legacy rating system for each of several service offerings. Additionally, each service offering may have its own rating system. The various solutions of the illustrated and described embodiments herein bring great flexibility to service providers to generate timely billing information.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

According to another embodiment, the adding of the generated charge amount to the respective record comprises the following being executed on the record to which the charge amount is added: reducing data volume of the usage data in the record. The method further comprises the following being executed by the pipeline batch processing system on the record comprising the usage data to be corrected in response to the receiving of the request to correct the invoice record before the correcting of the usage data: recovering of complete data volume of the usage data in the record. The method further comprises the following being executed by the pipeline batch processing system on the record comprising the corrected usage data after the correcting of the charge amount: the reducing of data volume of the usage data in the record. The reducing of the data volume of the usage data in the record comprises the following: deleting a portion of the usage data in the record in which the volume of the usage data record is to be reduced, the deleted portion being redundant for the generation of the invoice record using the record in which the volume of the usage data record is to be reduced, and generating an auxiliary record in the database, the auxiliary record being linked by a foreign key relationship with the record in which the volume of the usage data record is reduced and comprising the deleted portion of the usage data. The recovering of complete data volume of the usage data in the record comprises the following: merging the usage data stored in the record comprising the usage data which data volume of the usage data is to be recovered and in the auxiliary record linked by the foreign key relationship with the record comprising the usage data which data volume of the usage data is to be recovered in the record comprising the usage data which data volume of the usage data is to be recovered, and deleting the auxiliary record linked by the foreign key relationship with the record comprising the usage data which data volume of the usage data is recovered.

According to another embodiment, the usage data is a Call Detail Record (CDR). The generating of the charge amounts is executed batchwise for each group of the records comprising CDRs of the same type according to cumulative charging rules determining cumulative batch charging of CDRs of the same types.

This way of CDR processing can further accelerate the generation of the invoice record, because CDRs of the same type (e.g. internet session, voice communication, Short Message Services (SMS)) are generated in one batch. In other words, this way or CDR processing can enable processing of homogeneous data in each batch. In addition, it can simplify application of flexible rating rules. A flexible rating rule can for instance specify, that within the time interval of a billing cycle the first 10 Short Message Services (SMS) cost 10 Cent each and each next SMS costs 5 Cent each. The batch processing of SMS can be of an advantage in comparison with sequential processing of each SMS. In the first case an overall number of the SMS can be calculated in the batch process and an overall charge for all SMSs and/or the individual charge amounts for each of the SMS can be generated. In contrast the sequential processing of SMSs can require generation of additional counter to store a number of SMSs processed, said counter has to be read and updated during each process of sequential SMS processing.

According to another embodiment, the method further comprises the following being executed by the pipeline batch processing system before the correcting of the charge amount on each of the records which charge amounts were previously generated in one batch together with the record which usage data is corrected: the recovering of complete data volume of the usage data in the record. The correcting of the charge amount in the record comprises the following: repeating of the generating of the charge amounts in one batch for a group of the records comprising the record comprising the corrected usage data, and substituting the previously generated charge amounts in the respective records with the newly generated charge amounts. The following method further comprises the following being executed by the pipeline batch processing system after the correcting of the charge amount in the record comprising the corrected usage data on each of the records which charge amounts were generated in one batch together with the record comprising the corrected usage data: the reducing of data volume of the usage data in the record.

This embodiment can provide effective recalculation procedure of charge amounts for batch generation of the charge amounts, wherein instead of repeating of execution of all charge amounts the generation of only one batch is repeated.

According to another embodiment, the method of claim comprises further the following being executed by the pipeline batch processing system: receiving another request to correct the invoice record, the another request comprising an instruction to repeat the generation of the charge amounts generated in one of the previously generated batches according to another cumulative charging rule; executing the recovering of complete data volume of the usage data in the record for each of the records which charge amount is previously generated in said batch; after the executing of the recovering of complete data volume of the usage data in the record for each of the records which charge amount is previously generated in said batch repeating of the generating of the charge amounts in said batch according to the another cumulative charging rule; substituting the previously generated charge amounts in the respective records with the newly generated charge amounts; after the repeating of the generating of the charge amounts in said batch executing the reducing of data volume of the usage data in the record for each of the records which charge amount is previously generated in said batch; and after the substituting of the previously generated charge amounts in the respective records with the newly generated charge amounts executing the generating of another corrected invoice record.

The cumulative charging rule in this embodiment can be for instance the aforementioned rating rule for generating of charge amounts for SMSs. The embodiment can be simple and effective method for generating the corrected invoice record when another cumulative rating rule has to be applied. The integration of the method with the previously mentioned features can provide a number of advantageous synergistic effects. First, it is based on the aforementioned processes used for the generation of the original invoice record. Second, the volume of data processing is reduced in comparison with the volume of data processing needed for the generation of the original invoice record.

According to another embodiment, the generating of the invoice record is executed according to one of convergent billing rules, wherein the convergent billing rule determines the following: a surcharge amount to be added to the invoice record in accordance with the usage data comprised in the invoice record and/or the charge amounts comprised in the invoice record, and calculation of an overall charge amount for usage of the resources which usage data is comprised in the invoice record, the invoice record further comprising the overall charge amount.

This embodiment illustrates example convergent billing rules, which are used in convergent billing, wherein an overall charge amount is generated for usage of heterogeneous/different resources. The overall charge amount can comprise charge amounts not only for the typical services provided via the digital cellular telecommunication network (e.g. SMS, internet, voice communication) but for other services like purchasing of goods, downloading of music or films, etc.

According to another embodiment, the method further comprises the following being executed by the pipeline batch processing system: receiving yet another request to correct the invoice record, the yet another request comprising an instruction to repeat the generation of the invoice record according to another one of the convergent billing rules; and the generating of yet another corrected invoice record according to the another one of the convergent billing rules.

This embodiment can be advantageous for implementation of correction of the generated invoice record, when another convergent billing rule has to be applied for the generation of the corrected invoice record. This correction of the generated invoice record can be based on the same operation as generation of the original invoice record.

According to another embodiment, the convergent billing rule further determines a discount amount determining the charge amount for usage of one of the resources determined on a basis of the charge amount for usage of another one of the resources.

This embodiment illustrates another example convergent billing rule. According to this rule charge amount for usage of one resource can have an impact of the charge amount for usage of another resource. For instance, charging a user for a downloading of a film can comprise a bonus of 10 SMS messages sent for free.

According to another embodiment, the database is stored in a database system. The database system comprises a first data storage and a second data storage. The first data storage has shorter access time than the second data storage. The records are stored on the first data storage and the auxiliary records are stored on the second data storage.

This embodiment can provide advantageous utilization of memory for processing of the records. The records comprising information needed for the generation of the invoice record are stored on the first storage having shorter access time than the second storage, while the auxiliary records, needed for the generation of the corrected invoice record are stored on the second storage. This way of storing data can have a synergetic effect because it accelerates the generation of the original invoice records being the main load of the system generating the original invoice records and the corrected invoice records.

According to another embodiment, the method further comprises the following is being executed by the pipeline batch processing system in response to the receiving any of the requests to correct the invoice record: marking all of the records which primary keys are comprised in the invoice record, wherein the further generating of new charge amounts is executed only for the unmarked records, wherein the further generating of new invoice records is executed only for the unmarked records, wherein the generation of any of the corrected invoices is executed only of the marked records.

This embodiment can be advantageous for a safe separation of the records used in the processes related to the generation of the new invoice records and in the processes related the generation of the corrected invoice records. This separation can be an effective measure ensuring that the corrected invoice record comprises the same records and the original invoice record.

According to another embodiment, the first key set comprising the second key set.

This embodiment can be advantageous for performing the convergent billing. The first key set determines selection of the records for the generation of their respective charge amounts, while the second key set determines selection of the records for the generation of the invoice record. For instance, when the usage data is a CDR, the first key set can comprise the specification of the specific type of CDR (e.g. SMS) and the specification of the user (e.g. user identification), while the second key set can comprise only the specification of the user. As a result thereof, the generation of the charge amounts is executed only of one type of CDRs related to the user, while the generation of the invoice record is generated for all resources used by the user. In the other words, the second key set can have less number of the secondary keys than the first key set.

According to another embodiment, the receiving of the usage messages comprises sequentially receiving groups of the usage messages. Each group of the usage messages is received in a separate communication session, wherein the generating of the charge amounts for the usages of the respective resources which usage data are comprised in the records comprising one or more of the secondary keys of the first key set is executed when all groups of the usage messages are received.

This embodiment can be advantageous for transferring of big amounts of usage messages for processing and ensuring that all usage messages are processed.

According to another embodiment, the generating of the charge amounts is performed by a rating system of the digital cellular telecommunication system. The generating of the invoice records is performed by the billing system of the digital cellular telecommunication system. The usage messages are received from a network component of the digital cellular telecommunication system. The resources are provided via the network component to a user. The network component generates the usage messages related to usage of the resources by the user. The method further comprises: charging an account of the user with the overall charge amount comprised in the invoice record, if a remaining credit of an account balance of the account after the charging of the account with the overall charge amount comprised in the invoice record is above a threshold value, otherwise limiting the providing of the resources to said user, wherein the request to correct the invoice record is received from said user after the limiting of the providing of the resources; and after generating of the corrected invoice record, cancelling the limiting of the providing of the resources to said user and charging the account of the user with the overall charge amount comprised in the corrected invoice record, if a remaining credit of the account balance of the account after the charging of the account with the overall charge amount comprised in the corrected invoice record is above the threshold value.

This embodiment can be advantageous implementation of management of the user accounts and generating of the requests to correct the invoice records.

According to another embodiment, the records in the data base comprise respective primary keys and one or more respective secondary keys. The primary keys are used for unique identification of the records in the database and the secondary keys are used for identification of groups of the records in the database. The generating of the charge amounts for the usages of the respective resources is executed for the resources which usage data are comprised in the records comprising one or more of the secondary keys of a first key set. The invoice record comprises the primary keys comprised in the records comprising one or more of the secondary keys of a second key set. The charge amounts comprised in the invoice record are comprised in the records comprising one or more of the secondary keys of the second key set. The usage data comprised in the invoice record are comprised in the records comprising one or more of the secondary keys of the second key set. The corrected invoice record in the database comprises the primary keys comprised in the invoice record. The corrected charge amounts are comprised in the records comprising the primary keys comprised in the invoice record. The corrected usage data are comprised in the records comprising the primary keys comprised in the invoice record. The reducing of the data volume of the usage data in the record comprises the following: deleting a portion of the usage data in the record in which the volume of the usage data record is to be reduced, the deleted portion being redundant for the generation of the invoice record using the record in which the volume of the usage data record is to be reduced; and generating an auxiliary record in the database, the auxiliary record being linked by a foreign key relationship with the record in which the volume of the usage data record is reduced and comprising the deleted portion of the usage data. The recovering of complete data volume of the usage data in the record comprises the following: merging the usage data stored in the record comprising the usage data which data volume of the usage data is to be recovered and in the auxiliary record linked by the foreign key relationship with the record comprising the usage data which data volume of the usage data is to be recovered in the record comprising the usage data which data volume of the usage data is to be recovered; and deleting the auxiliary record linked by the foreign key relationship with the record comprising the usage data which data volume of the usage data is recovered.

FIG. 1 is a block diagram of a system landscape 100, according to an example embodiment. The system landscape 100 is an example of a computing environment within which some embodiments may be implemented. The system landscape comprises components of a digital cellular telecommunication network.

The system landscape 100 includes several devices 112, which can be operated by users. The devices 112 connect to an access point/network component 102 to access services that generates Usage Detail Records (UDR) based on chargeable access events. The several devices can be remote terminals including personal computers, smartphones, tablets, mobile hotspots, set-top boxes, other wireless enabled devices, and other devices connectable to the access point 102. The access point 102 is typically present in various embodiments. Although only a single access point 102 is illustrated, many access points 102 are typically present in various embodiments. The access point 102 may be one or more of a wireless telephone and data access point, a wired or wireless data network access point, a router, a hub, or other network-enabled device capable of generating UDRs. The access point 102 can be communicatively coupled to the pipeline batch processing system 111. The communicative coupling can be implemented e.g. via the digital cellular telecommunication network and/or fiber optic data transfer connection. Another access point 102 can be a network component (e.g. base station) of the digital cellular telecommunication network communicatively coupled to the pipeline batch processing system 111.

As one of the several devices utilizes the access point 102, a chargeable event transpires. Details of the event are captured, such as account identifying information, a location calling from, a time and duration of a call, a number called, an amount of data sent, an amount of data received, a number of messages sent and received, a resource accessed, a cost of premium content, cost of physical items purchased, and the like. This captured data is then written to a UDR. The UDR may be stored by the access point 102 and retrieved by a data processing system 103. The UDRs can be received from the access point 102 by the data processing system 103 as usage messages comprising the UDRs. The usage messages can be received by the by the pipeline batch system 111 separately (e.g. one by one) or in groups comprising several usage messages. The group can comprise 100-10000 usage messages, preferably 1000. The overall amount the received usage messages can be in the range of 10000-10000000. Processing of the usage messages can be started on the data processing system after the receiving of all usage messages or all groups of usage messages. This can be controlled by counting the overall number of usage messages received and comparing is with the predetermined overall amount of usage messages to be received. In addition overall numbers of the received usage messages of the same type can be counted and these numbers can be compared with the predetermined numbers of usage messages of the same type to be received.

The UDR comprise a usage description of a usage of a resource provided to a user via network component/access point 102 and or/digital cellular telecommunication network. The UDR can be but is not limited to a Call Detail Records (CDR), an Event Detail Records (EDR), and an Internet Protocol Detail Records (IPDR). The EDR can be a description of an item (e.g. music file, vide file, commercial goods) purchased by a user operating the device 112. The IPDR can be a description of an internet session provided via a network component 102 to a user.

The pipeline batch processing system 111 comprises a data processing system, a billing system 106, a rating system 105, and a database 104. The data processing system comprises a processor 107 and a main memory 108 (e.g. dynamic random access memory, DRAM). The data processing system is communicatively coupled to the billing system 106 and the rating system 105. The data processing system can be further communicatively coupled to one or more data storage devices 109 (e.g. hard disk drives (HDD) and/or solid state drives (SSD)). The data base 104 is configured to store records. The database is stored on a database system. The database system comprises a first data storage and a second data storage having longer access time than the first data storage. The first data storage can be allocated in the main memory 108, while the second data storage can be allocated in the data storage device 109 like HDD and/or SSD. Access time for retrieving data from the main memory 108 is less than access time for retrieving data for the storage device 109. The main memory can store at least a portion of a processor executable code, which when executed by the processor 107 causes the data processing system to process the usage messages.

The data processing system is configured to convert the received usage messages in the records stored in the database, wherein for each of the received usage message a respective dedicated record is created. Each record comprises a least a portion of the usage description comprised in the UDR of the respective usage message. The data record comprises sufficient information for generation of the charge amount for usage of the a resource, which usage description is comprised in the respective usage message.

The rating system 105 is configured to generate charge amounts for usage of the resources by processing of the records. The generation of the charge amount can be executed for a single record or batchwise for a group of records. The generating of the charge amount for a single record can be performed according to one or more charging rules, while generating of charge amounts for a group of the records can be performed using one or more cumulative charging rules. In contrast to the charging rules, the cumulative charging rules can determine charge amounts for records of the group which depend on a composition of the usage descriptions in the records of the group. For instance the cumulative charging rule may specify that the first 10 SMSs cost more than any further SMS (i.e. $11^{th}$, $12^{th}$, ... ). In particular, the rating system 105 performs rating activities with regard to converted usage messages that include representations and details of chargeable events, such as a cost of service usage, a telephone call, a text message, a data download, a purchase, and the like. The rating system 105 includes representations of billing terms for accounts, purchased items and services, and the like, such as may be defined in a customer account contract, terms of service, or pricing of an item or service. In some embodiments, each usage message comprising UDR is processed to identify applicable billing terms, which may be determined based an account identifying data included in the UDR in view of a database storing records associating accounts to contracts and contracts to billing terms. Based on the billing terms, the chargeable event of the UDR is rated and rating data is generated base thereon. The rating data (charge amounts) generated from a records comprising data of usage description may be referred to as a consumption item and generally includes account identifying data, data defining an event with regard to the respective account, and a cost element. Note that chargeable events represented in usage message, when rated and forming a consumption item, may not result in a cost element great than zero (0) or the cost element may be omitted. For example, a contract associated with an account may include unlimited or included amounts of certain usage, such as text messages, data, calling minutes, public transit usage, and the like. In such instances, the rated cost element may be zero. However, in some embodiments, the record and consumption item may simply be discarded.

The rating system 105, although illustrated as a single system, may instead be two or more rating systems 105. Each of the plurality of rating systems 105 may be different rating systems, such as may be procured from different software vendors or custom developed. As mentioned above, an example of a rating system 105, in some embodiments, is the Convergent Charging rating system available from SAP SE, of Walldorf, Germany.

The rating system 105, or plurality of rating systems 105, generally include four basic functions: 1) record comprising usage description in; 2) rating; 3) rating data output (e.g., consumption items, or modified data record comprising usage description and the respective charge amount); and 4) providing the consumption items or modified data records, and unrated usage events having their usage descriptions comprised in the records in some embodiments, to the data processing system 103, which stores them in the database 104. The first basic function, usage description data comprised in the records in generally operates to receive or retrieve the records or a group of the records from the database 104. The second basic function, rating, operates as discussed above with regard to perform rating activities to generate consumption items or modified records comprising charge amounts. However, the second basic function, rating, may be exposed via an application programming interface (API), a web service, a remote function, and the like. Exposing the second basic function allows the rating to be called by processes of the data processing system 103. The rating may be further called by processes of the billing system 106 to generate charge amount for the record comprising usage descriptions that was not rated, was improperly rated and is to be rerated, is to be rerated due to contract or legal changes, or otherwise is to be rerated as may be determined by the billing system 106 or as specified by an administrator or service agent.

The billing system 106 receives or retrieves one or both of the consumption items and the modified records comprising charge amounts from the database 104 rating system 106. Alternatively, the data processing system 103 can retrieve the consumption items and/or modified records from the database 104 and forward them to the billing system 106.

Generally, the invoicing billing system 106, or a larger system such as an Enterprise Resource Planning (ERP) system or Customer Relationship Management (CRM) system of which the billing system 106 is a part, includes configuration information logically defining each of the one or more rating systems 105 therein. The configuration information also typically includes network connectivity data for use in connecting with the data processing system 103 via a network. Additional configuration information may designate a periodic schedule for when data is to be retrieved from the database 104 or received from the data processing system 103.

The billing system 106 also includes configuration information. The configuration information of the billing system 106 identifies consumption item classes and/or classes of the modified records based on types of resources, which usage is described therein. The classification information can be used for generation of an invoice record for a group of consumption items or a group of modified records according to one or more convergent billing rules. The convergent billing rule can define one or more of the following and alike: a surcharge amount to be added to an overall charge amount of the invoice record, calculation of the overall charge amount, and a discount amount to be taken into account for calculation of the overall charge amount. The surcharge amount and/or discount amount and/or overall charge amount can be determined on a basis of the usage data comprised in the consumption items or modified records used for generation of the invoice record and/or the charge amounts in the consumption items or modified records used for generation the same. For instance, the overall charge amount can be a sum of the charge amounts. The discount amount can be generated if a sum of charge amounts for usage of resources of particular type exceeds a threshold value. Another discount amount can be applied for determination of a charge amount for usage of one resource on a basis of a charge amount for usage of another resource. For instance, if a user downloads a film, he is granted with 10 SMS free of charge. The surcharge amount can be generated when a charge amount for usage of one or more resources is below another threshold value. The convergent billing rules further define relations between usage data in the modified records (or consumption items) and a pricing structure, referred to as a rating area, such as may be defined in customer contracts, customer agreements, and other pricing structures. The convergent billing rules further define information associating one or more rating areas to each to one or more rating groups.

The pipeline batch processing system 111 can be communicatively coupled to a controlling component 110. The controlling component can be a separate unit or it can be comprised into the pipeline batch processing system 111. The controlling component is a computer system configured to perform controlling correctness of invoice records generated by the pipeline batch processing system 111 and/or performance of hardware and/or software components of the pipeline batch processing system 111. Root-causes causing failures in the invoice records can be but are not limited to: incorrect data in the usage messages, hardware failure of the components of the pipeline batch processing system, failure of algorithms employed for data processing in the pipeline batch processing system. When the controlling system detects a hardware failure of particular hardware component, then is can request correction of the invoice record, which was generated using the defect hardware unit. The controlling system can perform controlling of the software performance as well. For instance, if it is known a priori, that the for the generation of a particular invoice record the same amounts of records have to be processed by the rating system 105 and the billing system 106, the controlling component 110 can configure the data processing system 103 to count the records processed by the rating system 105 and the billing system 106. When the number of records processed by the billing system is not equal to the number of records processed by the rating system, then the controlling system generates a request to correct the invoice record. In addition, the controlling system can perform accounting and account controlling functions as it is customary in bookkeeping. With independent of the root-cause, when the controlling system detects that the generated invoice record is not correct, it sends the request to the data processing system 103 to correct the generated invoice record. The requests to correct invoice records can be generated on the remote terminals as well and sent by the remote terminals to the pipeline batch processing system. The remote terminals can generate these requests automatically and/or upon corresponding requests of the users operating the remote terminals.

Figure 2:
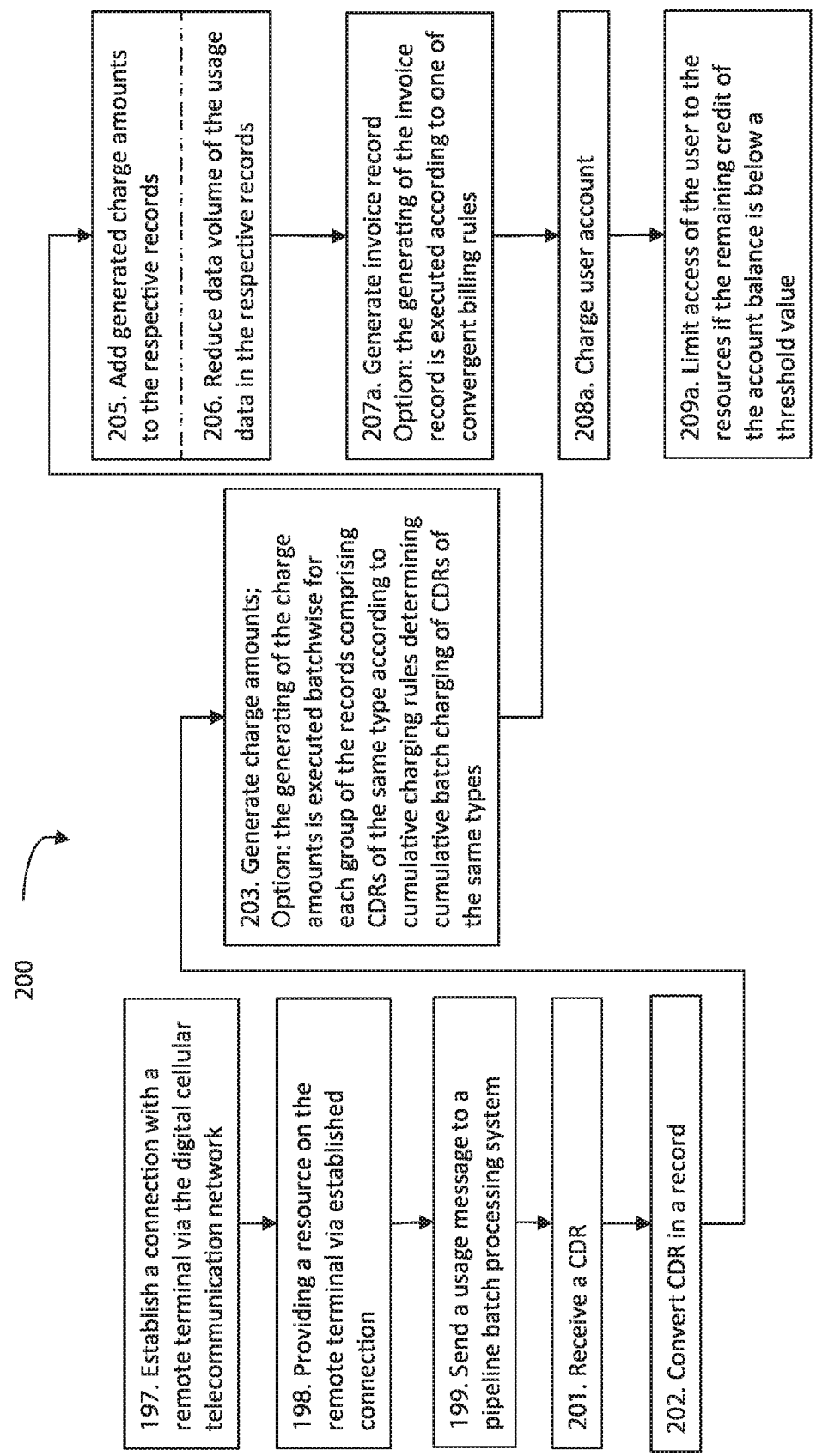
FIG. 2 shows a block flow diagram.

FIG. 2 is a block flow diagram 200 of a method comprising process blocks related to processing of the usage messages. The method is an example of a method that may be performed by a network component 102 in conjunction with a pipeline batch processing system 111 comprising a data processing system 103, one or more rating systems 105, and one or more billing systems 106.

The method begins with a process block 197. In the process block 197 a connection between the network component 102 and a remote terminal 112 is established. The connection can be established via a mobile digital cellular telecommunication network, wherein the network component is a base station or a network of the base stations of the digital cellular telecommunication network. Alternatively, the connection can be established between the remote terminal 112 and Wi-Fi hot spot 102 being communicatively coupled to the pipeline batch processing system via a digital cellular telecommunication network. Another option for communicative coupling between the remote terminal 112 and the pipeline batch processing system can be a wire connection like Ethernet.

A process block 198 is executed after the process block 198. In the process block 198 a resource is provided on the remote terminal 112 via the established connection. Afterwards a usage message is generated. The usage message can be generated by the network component. The usage message can be or can comprise a UDR. For instance, the network component being a base station of a digital cellular telecommunication network can generate a CDR related to a voice communication provided on the remote terminal e.g. mobile phone. In an another example, the resource provided can be a purchase in an internet shop, in this case the usage message can be generated by the internet shop and comprise details of the purchase, e.g. description of the purchased article or articles, price, bonus points related to the purchase.

A process block 199 is executed after the process block 198. In the process block 199 the usage message is sent to the data processing system 103 of the pipeline batch processing system 111.

A process block 201 is executed after the process block 199. In the process block 201 one or more usage messages are received by the data processing system 103. The usage message comprises usage data related to a usage of a resource provided via the digital cellular telecommunication system. The usage message can comprise a UDR. Alternatively the usage message can be a CDR being on one of the simplest and widely used formats of usage messages. The usage messages can be received in real time one by one after their generation. Alternatively they can be uploaded batch-wise in groups as it is described above.

A process block 202 is executed after the process block 201. In the process block 202 the received usage messages are converted into data records being stored in the database 104. There is one to one correspondence between the received usage messages and the generated in the database records. In response to receiving each of the usage messages a respective record in the database is created. Each record comprises at least a portion of the usage data comprised the respective usage message. The at least a portion of the usage data is sufficient for subsequent generation of a charge amount and an invoice record related to the usage description in the original usage message. The records comprise primary keys of the records for unique identification of the records in the database. The records comprise further secondary keys. The secondary keys enable identification of groups of records in the database. For instance, each record can comprise a unique number being a primary key. This data value can be used as a primary key for identification of this record in the database, because no other record comprises the same data value. Another data entity in the records can be user identification. Since at least some of the users use multiple resources several times, a number of records in the database comprise the same user identification. The data entity "user identification" is an example of a secondary key, since the values of this data entity determine of groups of the records, wherein each of the groups is related to one of the users. In order to save all data received in the usage message, a portion of the usage data, which is not comprised in the respective record, and/or other data of the usage message, which is not comprised in the respective record, can be stored in the database as a first auxiliary record being linked by a foreign key relationship with the respective record. This way of data management can facilitate data processing, because the data volume needed for subsequent generation of the charge amounts and the invoice record is reduced in comparison with the case when entire usage message is comprised in the record. More over reduction of data volume of the record can be repeated after further processing steps of the record, wherein the data being redundant for execution of the not yet executed processing steps is deleted in the record and stored in further auxiliary records. Thus executing of processing step requires retrieving records having less data volume in comparison with data volume of the records retrieved for execution of the previous processing step.

The database 104 can be stored on a database system comprising a first data storage and a second data storage, wherein the first data storage has shorter access time than the second data storage. The records can be stored on the first data storage (e.g. main memory 108) and the auxiliary data records can be stored on the second data storage (e.g. HDD 109). This way of data management can further facilitate/ accelerate data processing, because only data being actually needed for generation of charge amounts, invoice records, etc. is stored on a first data storage, while other data is stored on a second data storage.

Turning back to the example, wherein a CDR is received in the process block 201. The received CDR can comprise values of the following data entities:

1. type (voice communication, data transfer (internet session), SMS),
2. call cause definition (initiated by user, incoming call from a mobile phone, incoming call from fixed line phone, etc.),
3. user identification (a unique code assigned to a user for his identification in the mobile digital cellular telecommunication network),
4. user telephone number,
5. call date (a date on which the call is made),
6. call time (time when the call is started),
7. duration of the call (time interval measured in seconds),
8. call telephone number (telephone number dialed by user or a telephone number of incoming call),
9. number of bytes transmitted (this option is used only for CDRs related to data transfer e.g. internet sessions),
10. number of bytes received transmitted (this option is used only for CDRs related to data transfer (internet sessions)),
11. destination description (city, country),
12. time band (Peak, OffPeak, Weekend, Special1, Special2),
13. carrier (description a provider from which the call is organized),
14. country of origin (the country where the call is made),
15. network identification of a network (identification of a network of base stations which provided call connection),
16. CDR identification (unique code assigned to the CRD for its identification in the mobile digital cellular telecommunication network).

Figure 3:
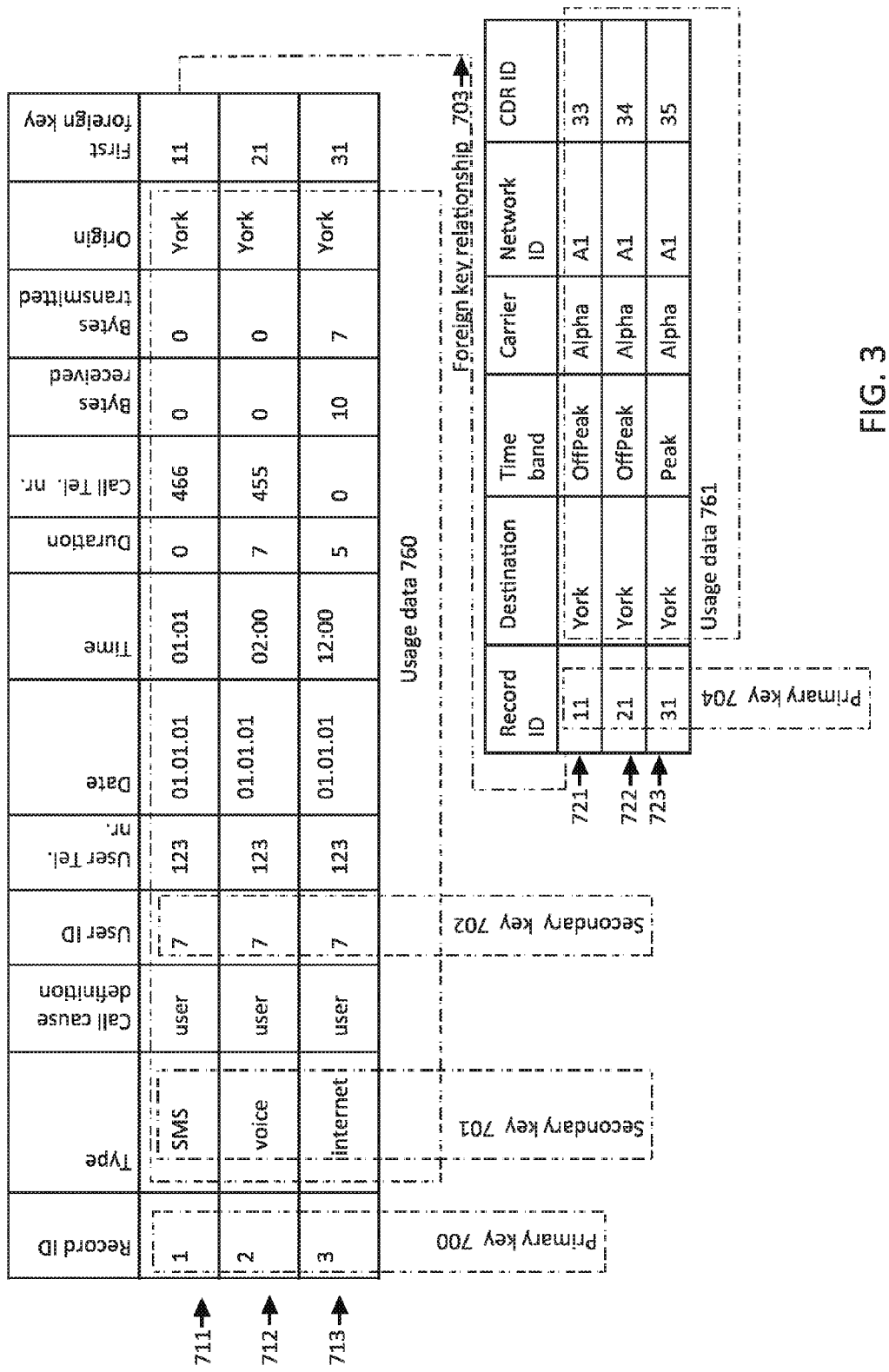
FIG. 3 shows example records represented in tables

In this example only a portion of the data entities in this list are required for subsequent generation of the charge amount related to this CDR and an invoice record comprising call description. Thus in the process block 202, a record 711 and first auxiliary record 721 linked by the foreign key relationship 703 to the record 711 are generated (FIG. 3). The record comprises the values of the entities nr. 1-10 and 14, while the first auxiliary record comprises the rest of the values. In the other words usage data of CDRs is split in two portions: usage data 760 of the records 711 and usage data 761 of the first auxiliary record 721. The values of entities 1 and 3 can be used as secondary keys 701, 702. The records and the first auxiliary records have primary keys 700 and 704 respectively. The primary keys of the first auxiliary records are used for foreign key relationships with the respective records. Further pairs of the records and the first auxiliary records 712 and 722, 713 and 723 are generated in the same way as the above discussed pair 711 and 721. Values, which are not relevant for a particular type, are represented by zero "0" values, e.g. "Bytes received" and "Bytes transmitted" are represented by zero in the record 712 related to communication type "voice".

A process block 203 is executed after the process block 202. In the process block 202 the charge amounts for the usages of the respective resources which usage data are comprised in the records comprising one or more of the secondary keys of a first key set are generated. The generation of the charge amounts can be executed separately for each of the records or batchwise for groups of the records. Alternatively the generation of the charge amounts can be executed for each of some of the records and batchwise for groups of the other records. Batchwise generation of the charge amounts for each group of the records can be executed according to the respective cumulative charging rule. For instance when the usage data is CDR, then the cumulative charging rule determines batch generation of charge amount for CDRs of specific type. The generation of the charge amounts are performed on the rating system 105. The records used for the generation of the charge amounts are retrieved from the database 104 by the data processing system 103 and afterwards inputted into the rating system. The retrieving of the records can be performed by querying of the database for the records comprising one or more secondary keys of the first key set.

Execution of the process block 203 can be triggered by various events. For instance execution of the process block 203 can be started when all usage messages and/or groups of usage messages are received and converted into the respective records in the database 104. This can be verified by comparing a predetermined number of the usage messages to be received with the number of the received usage messages and/or number of the records generated in response to receiving of the usage messages. Alternatively the usage messages can be received in real time on an instant basis and the execution of the process block 203 can be performed according to a schedule, e. g. the process block 203 can be executed once per billing cycle.

Turning back to the aforementioned example the generation of the charge amounts for one of the users can be performed in three batches corresponding to different example types of CDRs mentioned in the description of the first data entity in the list above. The records processed in the each of the batch comprise the specified user identification (data entity nr. 3 in the list above) and the respective specified CDR type (data entity nr. 1 in the list above). For instance in one of batches the charge amounts for the records related to CDRs of SMS type are generated according to the cumulative charging rule determining the cumulative batch charging of SMS. Execution of each of the three batches can be performed in the respective process block 203. The batches/process blocks 203 can be executed sequentially or in parallel.

A process block 205 is executed after the process block 203. In the process block 205 the generated charge amounts are added to the respective records. This can be preformed in a separate process on the data processing system, wherein the generated charge amounts are received from the rating system 105 and added to the respective records. Alternatively this process can be performed in the previous process block 203 by the rating system 105, wherein the generated charge amounts are added to the records in the process of the generation of the charge amounts. In the latter case, the records comprising the charge amounts are received by the data processing system 103 in the process block 203 and execution of the process block 205 is not needed. The process block 205 can comprise an optional process block 206.

In the process block 206 data volume of the usage data in the record is reduced in a way that the remaining usage data is sufficient for subsequent generation of the invoice record. The process block 206 can be executed for the records processed in the process block 202 and/or in the process block 203.

The process block 206 can comprise the following process blocks: deleting a portion of the usage data in the record in which the data volume of the usage data record is to be reduced, the deleted portion being redundant for the generation of the invoice record using the record in which the data volume of the usage data record is to be reduced; and generating an second auxiliary record in the database, the second auxiliary record being linked by a foreign key relationship with the record in which the data volume of the usage data record is reduced and comprising the deleted portion of the usage data. The purpose and the procedure of the generation of the second auxiliary record is the same as the purpose and the procedure of the generation of the first auxiliary record, i.e. store on the first data storage (e. g. memory 108) only the data which is relevant for further processing of the records, the data which is redundant for the further processing is stored on the second data storage (e. g. HDD 109).

Figure 4:
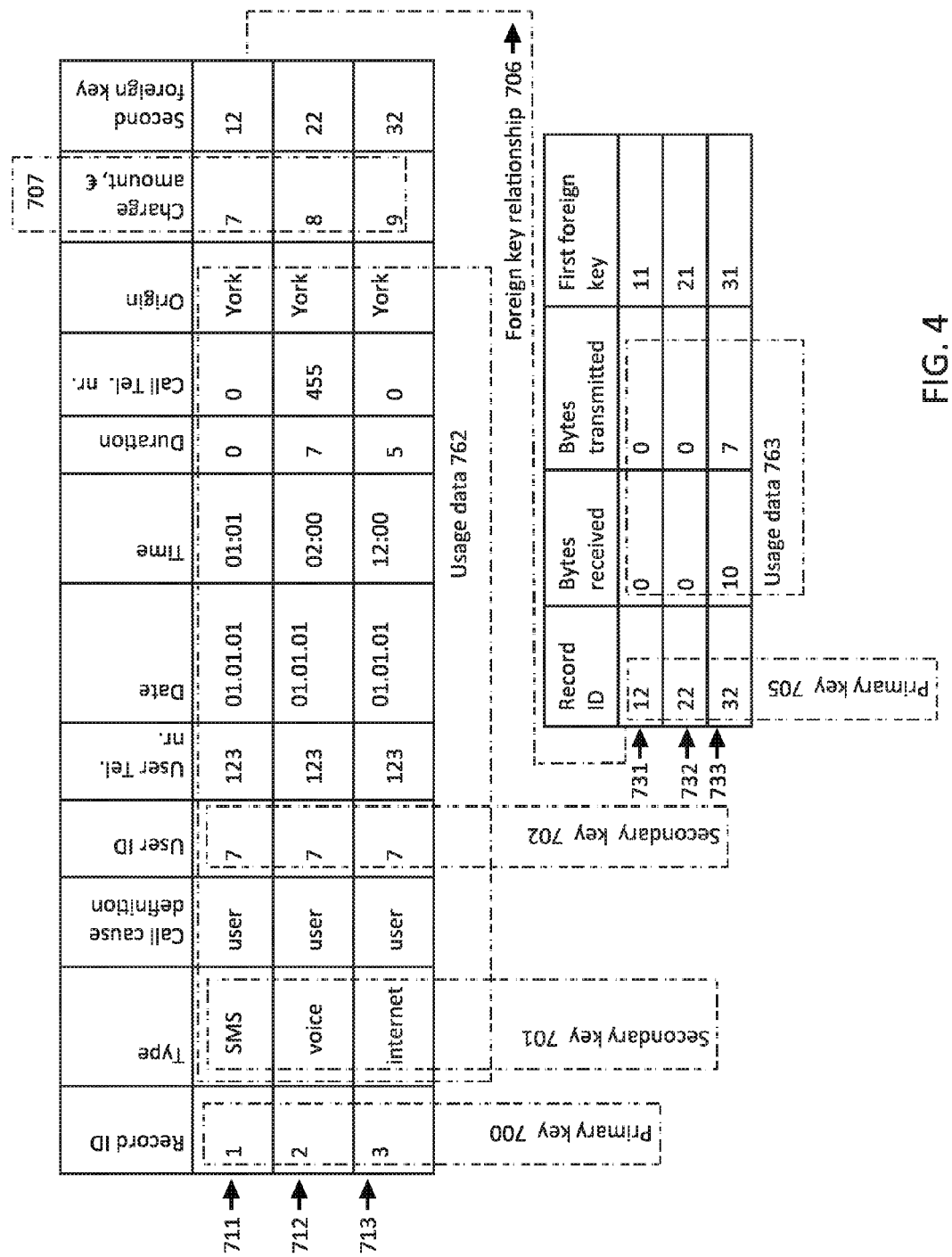
FIG. 4 shows example records represented in tables

Turning back to the aforementioned example, the execution of the process blocks 205 and 206 results in deleting of the values of the data entities nr. 9 and 10 of the aforementioned list in the record 711 and storing the values of these data entities in a newly generated second auxiliary record 731 linked by the foreign key relationship 706 with the records 711 (FIG. 4). In the other words the usage data 760 of the record 711 is split into two portions: usage data 762 of the record 711 and usage data 763 of the record 731. Further, the value of the charge amount 707 is added to the record 711. In addition, foreign keys linking the record 711 with the first auxiliary record 721 can be deleted in the record 711 and stored in the respective second auxiliary record 721. Further pairs of the records and the first auxiliary records 712 and 732, 713 and 733 are generated in the same way as the above discussed pair 711 and 731.

A process block 207a is executed after the process block 203 if the process block 205 is skipped or after the process block 205 if the latter is executed.

In the process block 207a an invoice record is generated. The generation of the invoice record is performed by the billing system 106. The data processing 103 system retrieves records from the database 104 which comprise one or more secondary keys of the second key set. Afterwards it inputs the retrieved records into the billing system for the generation of the invoice record. When it receives the generated invoice record from the billing system 106 it stores it in the database 104. The data processing system 103 can store the invoice record on the first data storage and move the records used for the generation of the invoice record from the first data storage to the second data storage. This allocation of data follows the approach formulated in the process block 206, since only the invoice record is required for execution of further optional process blocks 208a and 209a. The generating of the invoice record can be executed according to one or more of the convergent billing rules discussed above. For instance, the convergent billing rule can specify calculation of an overall charge on a basis of data comprised in the retrieved records. Application of the convergent billing rules enables generation of the invoice record even when there is no records comprising the one or more keys of the second key set are stored in the database. In this case the data processing system sends the second key set to the billing system in combination with a request to generate an invoice record for instance for the specified billing period. The invoice record can have zero overall charge or one or more fixed charges determined by one or more convergent billing rules associated with the second key set (e.g. user identification). The invoice record comprises the primary keys comprised in the records comprising one or more of the secondary keys of a second key set, charge amounts comprised in the records comprising one or more of the secondary keys of the second key set, and the usage data comprised in the records comprising one or more of the secondary keys of the second key set. Identification of one or more of the convergent billing rules for the generation of the invoice record can be performed by the billing system 106 and/or data processing system. The data volume of the usage data comprised in the invoice record can be further reduced in a similar way as in the process block 206.

Figure 5:
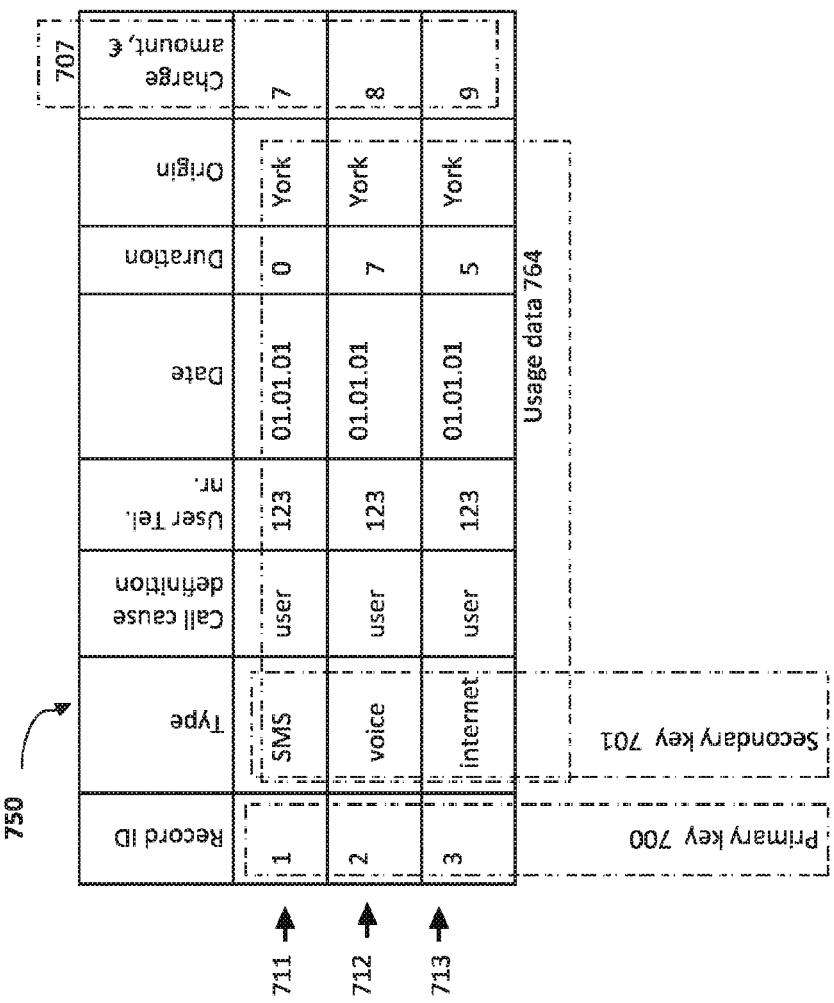
FIG. 5 shows example invoice record in a table

Turning back to the aforementioned example the invoice record comprises the values of a further limited list of the data entities. The invoice record 750 generated for the user having ID "7" comprises values of the entities nr 1, 2, 4, 5, 7 and 14 (FIG. 5). Other values of the data entities are only stored in the records e.g. 711-713 and the auxiliary records, e.g. 721-722 and 731-733. In the other words the usage data 764 is the portion of the usage data 762, while the usage data 762 is the portion of the usage data 760.

The first key set can comprise the second key set. This dependency reflects convergent nature of processing of the records, wherein in the next following step of processing of the records (e. g. process block 207a) at least the same amount of records is used as in the previous set of processing of the records (e. g. process block 203). This dependency can be used for optimization and/or verification of correctness of functioning of the method, which process blocks are depicted on FIG. 2.

Optional process blocks 208a and 209a are executed after the process block 207a in any sequence or in parallel to each other. In the process block 208a an account of the user is charged with the overall charge comprised in the invoice record, if the account can be charged with the overall amount, e. g. the account is not blocked or the charging of the account will keep the remaining credit of the account balance above a threshold value, i.e. will not cause the blocking of the account and/or refusal of charging. If the charging of the account with the overall charge amount cannot be executed, then the process block 209a is executed wherein the access of the access of the user to the resources is limited. The process block 209a or 208a can comprise a notification of the user that the remaining credit of his account balance is too low to cover the overall charge amount specified in the invoice record and as a result thereof his access to the resources is limited. For instance, it can be limited to calling only emergency services.

Those skilled in the art will readily understand that several invoice records can be generated in parallel using a method depicted as a block flow diagram 200.

Figure 6:
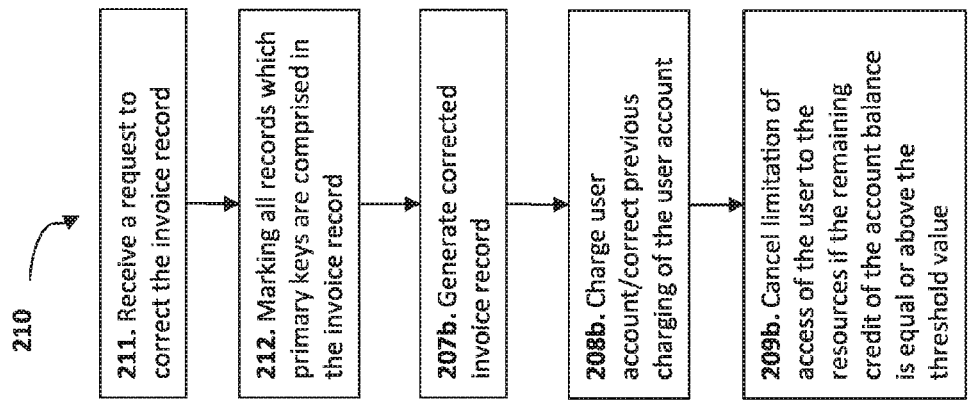
FIG. 6 shows a block flow diagram.

FIG. 6 is a block flow diagram 210 of a method comprising process blocks related to a method for correction of the generated invoice record. The block flow diagrams 200 and 210 can further represent a method for generation of the invoice records and correction of the generated invoice records in conjunction with management of user accounts.

The block flow diagram begins with a process block 211. In the process block a request to correct the invoice record is received by the data processing system 103. The generation of the request can be initiated by the user, who has noticed a mistake in the invoice record addressed to him, or by a user who's access to the resources is limited because of faulty invoice record. The request can be generated on the remote terminal operated by the user. Alternatively the request to correct the invoice record can be generated by the data processing system 103 itself for instance as a result of execution of internal routine of controlling of the generated invoice records or by the controlling unit 110.

An optional process block 212 is executed after the process block 212. In the process block 212 all records used for the generation of the invoice record, which correction was requested in the process block 211, are marked. Several following example measures can be used for the marking of the records separately or in any arbitrary combination. The list of the primary keys of the records to be marked can be generated. The primary keys and/or secondary keys of the records can be modified to indicate that the records are marked. For instance, this can be implemented by special modification of the reserved bits in words used for storage of the primary and/or secondary keys. Additional marker data entity can be added to the records. A value of the marker data entity can be equal to an identification number of the invoice record. These measures ensure, that the corrected invoice record is generated using the same records. This is especially important, when parallel generation of the new invoice records and the corrected invoice records is executed. The request to correct the invoice record can comprise correction instructions, which execution results in a change of the list of the records complying with the selection criteria used for selection of the records in the process of the generation of the original invoice record. As a result, the corrected record is generated using another list of the records. Changes in the list of the records used for the generation of the original invoice record and the corrected invoice record can cause cascades of the requests to generate the corrected records, which in its own turn can adversely affect performance of the data processing system 103. In addition, the data of the corrected records can be absent in the corrected invoice record making it impossible to check whether the request to correct the invoice record is executed correctly.

Marking of records can be used by the data processing system as 103 selection criteria of the records used for the generation of the new charge invoices and the new invoice records. For instance, the data processing system 103 can be programmed to use only unmarked records for the generation of the new charge amounts and the new invoice records. This measure prevents appearing of data of the corrected record in the corrected invoice record and at the same time in the newly generated invoice record.

A process block 207b is executed after the process block 211 or after the optional process block 212 if the latter is executed. The corrected invoice record is generated in the process block 207b. This can be done after correction of the records used for the generation of the original invoice record. In addition or alternatively, another convergent billing rule can be used for the generation of the corrected invoice record. The details of these procedures will be described further in the text. The process block 207a and the process block 207b can be based on the same procedures: first, the data processing system 103 retrieves the data records from the database; afterwards it sends the retrieved data records to the billing system 106 for the generation of the (corrected) invoice record. When the marking is used, the selection of the data records in the process blocks 207a and 207b is different. In the process block 207a the records comprising one or more secondary keys of the second key set are selected for the generation of the original invoice record, while in the process block 207b the marked records are selected for the generation of the corrected invoice record, wherein the marking of the records is performed in a way insuring selection of the same data records for the generation of the original invoice record and the corrected invoice record.

Optional process blocks 208b and 209b are executed after the process block 207b in any sequence or in parallel to each other. In the process block 208b the account of the user is charged with the overall charge comprised in the corrected invoice record, if the account was not charged in the process block 208a and it can be charged with the overall amount, e. g. the account is not blocked or the charging of the account will keep the remaining credit of the account balance above a threshold value, i.e. will not cause the blocking of the account and/or refusal of charging. If the account of the user was charged with the overall amount of the original invoice record in the process block 208a, then the remaining credit of the account balance is corrected according to a difference of the overall charge amount of the original invoice record and the overall charge amount of the corrected invoice record in the process block 208b.

If the charging of the account with the overall charge amount of the corrected invoice record or correction of the remaining credit of the account balance results in the remaining credit of the account balance being below the threshold, then the access of the user to the resources is limited or remains limited, otherwise the limitation of the access of the user to the resources is cancelled, if it was set before in the process block 209a.

Figure 7:
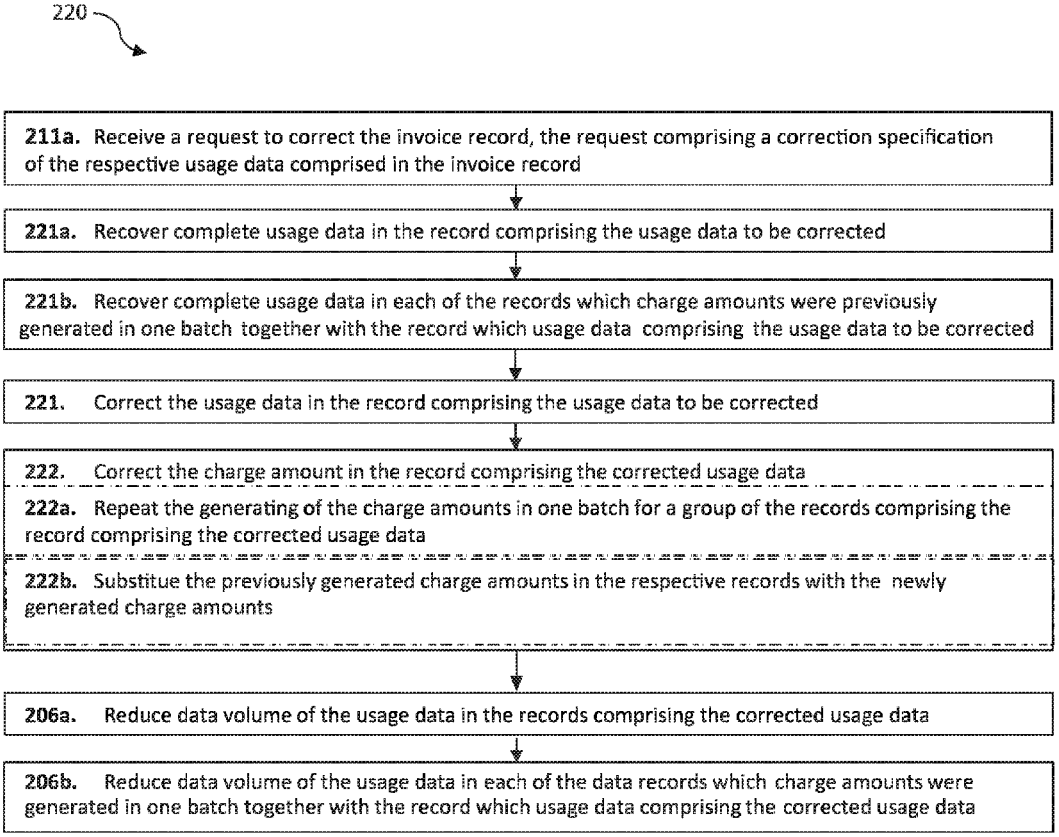
FIG. 7 shows a block flow diagram.

FIG. 7 is a block flow diagram 220 of a method comprising process blocks related to an extension of the method for correction of the generated invoice record, which block flow diagram 210 is depicted on the FIG. 3.

Process block 211a is an example of the process block 211. The request, received in the process block 211a comprises a correction specification of the usage data comprised in the invoice record. Since the invoice record comprises primary key of the record comprising the usage data to be corrected according to the correction specification, this record can be easily retrieved from the database using said primary key as identification of the record to be retrieved. As specified above, the usage data to be corrected in the invoice record is the same as in the retrieved record or it is comprised in the usage data of the retrieved record.

A process block 221a is executed, if the optional process block 206 was executed for the retrieved record. In the process block 221a the data volume of the usage data in the retrieved record is recovered, i.e. the usage data in the retrieved record becomes the same as it was before the execution of the process block 206. This can be executed as follows by the data processing system 103: retrieving from the database 104 the second auxiliary record linked by the foreign key relationship with the record retrieved form the database 104 in the process block 211a; merging the usage data stored in the retrieved second auxiliary record with the usage data stored in the retrieved record in the retrieved record; and deleting the second auxiliary record linked by the foreign key relationship with the record comprising the usage data which data volume of the usage data is recovered.

A process block 221b is executed after the process block 221a if the charge amount for the record comprising the usage data to be corrected was executed in one batch with other records as specified above in the optional implementation of the process block 203. The data volume of the usage data is recovered for all records which charge amounts were generated previously in the same batch with the record comprising the usage data to be corrected. Alternatively, the volume of the usage data can be recovered for all marked records complying with the selection criteria (e.g. comprising one or more secondary keys of the respective first key set), which were used for selection of the records to be processed in the previous batch in the process block 203.

Procedures of the process blocks 211*a*, 221*a*, and 221*b* can be executed in a different way. First, a list of the records, which data volume of the usage data has to be recovered is identified; afterwards data volume of the usage data is recovered batchwise for all records of the list.

Depending on execution of the optional process blocks 221*a* and 221*b*, a process block 221 is executed after one of the process blocks: 211*a*, 221*a*, or 221*b*. In the process block 221 the usage data comprised in the record to be corrected is corrected according to correction specification received in the process block 211*a*. The correction can be performed by the data processing system 103.

A process block 222 is executed after the process block 221. In the process block 222 the charge amount in the record comprising the corrected usage data is corrected. This can be done in several ways. If the charge amount for this record was generated separately from other records, then this record is sent to the rating system 105 for the generation of a new charge amount. Afterwards the rating system 105 or the data processing system substitute the previously generated charge amount in the record with the newly generated charge amount in an optional process block 222*b* of the process block 222.

If the charge amount was generated for the record comprising the corrected usage data in one batch with other records, then the batch generation of the charge amounts is repeated for a group of records comprising the record with corrected usage data in an optional process block 222*a* of the process block 222. The group of records, for which the batch generation is repeated, can be the same as in the previous batch. Alternatively, it can be a group comprising the record with corrected usage data and other marked records, which comply with selection criteria used for selection of the records for execution of the previous batch (e.g. one or more secondary keys of the respective first key set). Afterwards the rating system 105 or the data processing system 103 substitute the previously generated charge amounts in the records of the group used for repeating of the batch generation with the respective newly generated charge amounts in the optional process block 222*b* of the process block 222.

Optional process blocks 206*a* is executed after the process block 222 if the respective optional process block 221*a* is executed. Optional process block is executed either after the process block 222 or after the process block 206*b* if the respective process block 221*b* is executed. The process blocks 206*a* and 206*b* are executed in the same way as the process block 206.

The process blocks 206*a* and 206*b* can be executed in one batch for all records which charge amounts were generated in one batch in the process block 222.

FIG. 8 is a block flow diagram 230 of a method comprising process blocks related to an extension of the method for correction of the generated invoice record, which block flow diagram 210 is depicted on the FIG. 3.

Process block 211*b* is an example of the process block 211. The request, received in the process block 211*b* comprises a correction specification to repeat the generation of the charge amounts generated on one of the previously executed batches according to another cumulative charging rule.

An optional process block 221*c* is executed after the process block 221*a* if the respective optional process block 206 is executed. The process block 221*c* is executed in the same way as the process block 221*b*.

A process block 222*c* is executed either after the process block 211*b* or after the optional process block 221*c*. In the process block 222*c* the generation of the charge amounts for a group of records is repeated in one batch according to the anther cumulative charging rule. Further details of the execution of the process block 222*c* are the same as in the description of the execution of the process blocks 222*a*.

The process block 222*b*, described above, is executed after the process block 222*a*.

Optional process block 206*c* is executed after the process block 222*b*, if the respective optional process block 221*c* was executed. The process block 206*c* is executed in the same way as the process block 206*b*.

The process blocks 221*c*, 222*b*, and 206*c* are executed in the flow diagram 230 for the same group of the records.

FIG. 9 is a block flow diagram 240 of a method comprising process blocks related to an extension of the method for correction of the generated invoice record, which block flow diagram 210 is depicted on the FIG. 3.

Process block 211*c* is an example of the process block 211. The request, received in the process block 211*c* comprises a correction specification to repeat the generation of the invoice record according to another one of the convergent billing rules.

A process block 207*c* executed after the process block 211*c*. The process block 207*c* is based on the same procedures as the process blocks 207*a* and 207*b*. First a group of records is retrieved from the database. The records of the group have the same primary keys as specified in the originally generated invoice record and/or comprise one or more secondary keys of the respective second key set, which was used for identification of the records used for the generation of the original invoice record. Afterwards the corrected invoice record is generated for the group of records according to the another one of the convergent billing rules specified in the request received in the process block 211*c*. Further execution of the process block 207*b* is the same as the generation of the process block 207*a*.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

The invention claimed is:

1. A telecommunication method in a mobile digital cellular telecommunication system, the method comprising the following being executed by a network component of the mobile digital cellular telecommunication system:
establishing a connection with a remote terminal via the digital cellular telecommunication network;
providing a resource on the remote terminal via the established connection;
and sending a usage message to a pipeline batch processing system of the mobile digital cellular telecommunication system, the usage message comprising usage data related to a usage of the resource provided on the remote terminal, wherein the pipeline batch processing system is a data processing system configured to perform pipeline processing of data records according to a sequence of chained processes;

wherein the method further comprises the following being executed by the pipeline batch processing system:

receiving the usage message;

converting the received usage message into a record in a database of the mobile digital cellular telecommunication system, the record comprising the usage data, a primary key, and one or more secondary keys, wherein the primary keys are used for unique identification of the records in the database and the secondary keys are used for identification of groups of the records in the database;

generating charge amounts for the usages of the respective resources which usage data are comprised in the records comprising one or more of the secondary keys of a first key set;

adding the generated charge amount to the respective record;

generating an invoice record in the database, the invoice record comprising:

the primary keys comprised in the records comprising one or more of the secondary keys of a second key set, charge amounts comprised in the records comprising one or more of the secondary keys of the second key set, and the usage data comprised in the records comprising one or more of the secondary keys of the second key set;

receiving a request to correct the invoice record from a controlling component of the mobile digital cellular telecommunication system, the request comprising a correction specification of the respective usage data comprised in the invoice record;

correcting the usage data in the record comprising the usage data to be corrected, wherein the usage data is corrected according the correction specification; correcting the charge amount in the record comprising the corrected usage data;

generating a corrected invoice record in the database, the corrected invoice record comprising: the primary keys comprised in the invoice record, the corrected charge amounts comprised in the records comprising the primary keys comprised in the invoice record, and the corrected usage data comprised in the records comprising the primary keys comprised in the invoice record;

wherein the adding of the generated charge amount to the respective record comprises the following being executed on the record to which the charge amount is added:

reducing data volume of the usage data in the record;

wherein the method further comprises the following being executed by the pipeline batch processing system on the record comprising the usage data to be corrected in response to the receiving of the request to correct the invoice record before the correcting of the usage data:

recovering of complete data volume of the usage data in the record; wherein the method further comprises following being executed by the pipeline batch processing system on the record comprising the corrected usage data after the correcting of the charge amount:

wherein the reducing of the data volume of the usage data in the record comprises the following: deleting a portion of the usage data in the record in which the volume of the usage data record is to be reduced, the deleted portion being redundant for the generation of the invoice record using the record in which the volume of the usage data record is to be reduced, and generating an auxiliary record in the database, the auxiliary record being linked by a foreign key relationship with the record in which the volume of the usage data record is reduced and comprising the deleted portion of the usage data;

wherein the recovering of complete data volume of the usage data in the record comprises the following:

merging the usage data stored in the record comprising the usage data which data volume of the usage data is to be recovered and in the auxiliary record linked by the foreign key relationship with the record comprising the usage data which data volume of the usage data is to be recovered in the record comprising the usage data which data volume of the usage data is to be recovered, and deleting the auxiliary record linked by the foreign key relationship with the record comprising the usage data which data volume of the usage data is recovered.

2. The method of claim 1, the usage data being a Call Detail Record (CDR), wherein the generating of the charge amounts is executed batch wise for each group of the records comprising CDRs of the same type according to cumulative charging rules determining cumulative batch charging of CDRs of the same types.

3. The method of claim 2, wherein the method further comprises following being executed by the pipeline batch processing system before the correcting of the charge amount on each of the records which charge amounts were previously generated in one batch together with the record which usage data is corrected:

the recovering of complete data volume of the usage data in the record; wherein the correcting of the charge amount in the record comprises the following:

repeating of the generating of the charge amounts in one batch for a group of the records comprising the record comprising the corrected usage data; and substituting the previously generated charge amounts in the respective records with the newly generated charge amounts;

wherein the method further comprises the following being executed by the pipeline batch processing system after the correcting of the charge amount in the record comprising the corrected usage data on each of the records which charge amounts were generated in one batch together with the record comprising the corrected usage data.

4. The method of claim 2, the method further comprising the following being executed by the pipeline batch processing system:

receiving another request to correct the invoice record, the another request comprising an instruction to repeat the generation of the charge amounts generated in one of the previously generated batches according to another cumulative charging rule; executing the recovering of complete data volume of the usage data in the record for each of the records which charge amount is previously generated in said batch;

after the executing of the recovering of complete data volume of the usage data in the record for each of the records which charge amount is previously generated in said batch repeating of the generating of the charge amounts in said batch according to the another cumulative charging rule;

substituting the previously generated charge amounts in the respective records with the newly generated charge amounts;

after the repeating of the generating of the charge amounts in said batch executing the reducing of data volume of the usage data in the record for each of the records which charge amount is previously generated in said batch; and after the substituting of the previously generated charge amounts in the respective records with the newly generated charge amounts executing the generating of another corrected invoice record.

5. The method of claim 1, wherein the generating of the invoice record is executed according to one of convergent billing rules, wherein the convergent billing rule determines the following:
   a surcharge amount to be added to the invoice record in accordance with the usage data comprised in the invoice record and/or the charge amounts comprised in the invoice record;
   and calculation of an overall charge amount for usage of the resources which usage data is comprised in the invoice record, the invoice record further comprising the overall charge amount.

6. The method of claim 5, the method further comprising the following being executed by the pipeline batch processing system:
   receiving yet another request to correct the invoice record, the yet another request comprising an instruction to repeat the generation of the invoice record according to another one of the convergent billing rules; and the generating of yet another corrected invoice record according to the another one of the convergent billing rules.

7. The method of claim 5, wherein the convergent billing rule further determines a discount amount determining the charge amount for usage of one of the resources determined on a basis of the charge amount for usage of another one of the resources.

8. The method of claim 5, wherein the generating of the charge amounts is performed by a rating system of the pipeline batch processing system, wherein the generating of the invoice records is performed by the billing system of the pipeline batch processing system, wherein the usage messages are received from the network component, the resources being further provided via the network component, the method further comprising the following being executed by the network component:
   generating the usage messages related to the usage of the resources; wherein the method further comprises the following being executed by the pipeline batch processing system: charging an account of the user with the overall charge amount comprised in the invoice record if a remaining credit of an account balance of the account after the charging of the account with the overall charge amount comprised in the invoice record is above a threshold value, otherwise limiting the providing of the resources to said user; and after generating of the corrected invoice record, cancelling the limiting of the providing of the resources to said user and charging the account of the user with the overall charge amount comprised in the corrected invoice record, if a remaining credit of the account balance of the account after the charging of the account with the overall charge amount comprised in the corrected invoice record is above the threshold value.

9. The method of claim 1, the database being stored in a database system comprising a first data storage and a second data storage, the first data storage having shorter access time than the second data storage, the records being stored on the first data storage and the auxiliary records being stored on the second data storage.

10. The method of claim 1, wherein the method further comprises following being executed by the pipeline batch processing system in response to the receiving any of the requests to correct the invoice record:
   marking all of the records which primary keys are comprised in the invoice record, wherein the further generating of new charge amounts is executed only for the unmarked records, wherein the further generating of new invoice records is executed only for the unmarked records comprising the unmarked primary keys, wherein the generation of any of the corrected invoices is executed only of the records comprising the marked primary keys.

11. The method of claim 1, the first key set comprising the second key set.

12. The method of claim 1, the receiving of the usage messages comprising sequentially receiving groups of the usage messages, each group of the usage messages being received in a separate communication session, wherein the generating of the charge amounts for the usages of the respective resources which usage data are comprised in the records comprising one or more of the secondary keys of the first key set is executed when all groups of the usage messages are received.

13. A mobile digital cellular telecommunication system comprising a pipeline batch processing system, a network component, a controlling component, and a database, wherein the pipeline batch processing system is a data processing system configured to perform pipeline processing of data records according to a sequence of chained processes, wherein the network component is configured to perform the following:
   establishing a connection with a remote terminal via the digital cellular telecommunication network;
   providing a resource on the remote terminal via the established connection;
   and sending a usage message to a pipeline batch processing system, the usage message comprising usage data related to a usage of the resource provided on the remote terminal;
   wherein the pipeline batch processing system is configured to perform the following:
   receiving the usage message;
   converting the received usage message into a record in a database of the mobile digital cellular telecommunication system, the record comprising the usage data, a primary key, and one or more secondary keys, wherein the primary keys are used for unique identification of the records in the database and the secondary keys are used for identification of groups of the records in the database;
   generating charge amounts for the usages of the respective resources which usage data are comprised in the records comprising one or more of the secondary keys of a first key set;
   adding the generated charge amount to the respective record;
   generating an invoice record in the database, the invoice record comprising: the primary keys comprised in the records comprising one or more of the secondary keys of a second key set, charge amounts comprised in the records comprising one or more of the secondary keys of the second key set, and the usage data comprised in the records comprising one or more of the secondary keys of the second key set;
   receiving a request to correct the invoice record from a controlling component of the mobile digital cellular telecommunication system, the request comprising a correction specification of the respective usage data comprised in the invoice record;

correcting the usage data in the record comprising the usage data to be corrected, wherein the usage data is corrected according the correction specification;

correcting the charge amount in the record comprising the corrected usage data; generating a corrected invoice record in the database, the corrected invoice record comprising:

primary keys comprised in the invoice record, charge amounts comprised in the corrected records comprising the primary keys comprised in the invoice record, and the corrected usage data comprised in the records comprising the primary keys comprised in the invoice record; and wherein the adding of the generated charge amount to the respective record comprises the following being executed on the record to which the charge amount is added:

reducing data volume of the usage data in the record;

wherein the method further comprises the following being executed by the pipeline batch processing system on the record comprising the usage data to be corrected in response to the receiving of the request to correct the invoice record before the correcting of the usage data:

recovering of complete data volume of the usage data in the record; wherein the method further comprises following being executed by the pipeline batch processing system on the record comprising the corrected usage data after the correcting of the charge amount:

wherein the reducing of the data volume of the usage data in the record comprises the following: deleting a portion of the usage data in the record in which the volume of the usage data record is to be reduced, the deleted portion being redundant for the generation of the invoice record using the record in which the volume of the usage data record is to be reduced, and generating an auxiliary record in the database, the auxiliary record being linked by a foreign key relationship with the record in which the volume of the usage data record is reduced and comprising the deleted portion of the usage data;

wherein the recovering of complete data volume of the usage data in the record comprises the following:

merging the usage data stored in the record comprising the usage data which data volume of the usage data is to be recovered and in the auxiliary record linked by the foreign key relationship with the record comprising the usage data which data volume of the usage data is to be recovered in the record comprising the usage data which data volume of the usage data is to be recovered, and deleting the auxiliary record linked by the foreign key relationship with the record comprising the usage data which data volume of the usage data is recovered.

14. The system of claim 13, the usage data being a Call Detail Record (CDR), wherein the generating of the charge amounts is executed batchwise for each group of the records comprising CDRs of the same type according to cumulative charging rules determining cumulative batch charging of CDRs of the same types.

15. The system of claim 14, wherein the pipeline batch processing system is configured to perform the following before the correcting of the charge amount on each of the records which charge amounts were previously generated in one batch together with the record which usage data is corrected:

the recovering of complete data volume of the usage data in the record;

wherein the correcting of the charge amount in the record comprises the following:

repeating of the generating of the charge amounts in one batch for a group of the records comprising the record comprising the corrected usage data; and substituting the previously generated charge amounts in the respective records with the newly generated charge amounts;

wherein the pipeline batch processing system is configured to perform the following after the correcting of the charge amount in the record comprising the corrected usage data on each of the records which charge amounts were generated in one batch together with the record comprising the corrected usage data.

16. A telecommunication method in a mobile digital cellular telecommunication system, comprising:

receiving a usage message on a pipeline batch processing system from a network component, the usage message comprising usage data related to a usage of a resource provided on a remote terminal by the network component, wherein the pipeline batch processing system is a data processing system configured to perform pipeline processing of data records according to a sequence of chained processes;

converting the received usage message into a record in a database of the mobile digital cellular telecommunication system, the record comprising the usage data;

generating charge amounts for the usages of the respective resources;

adding the generated charge amount to the respective record, wherein the adding of the generated charge amount to the respective record comprises the following being executed on the record to which the charge amount is added: reducing data volume of the usage data in the record;

generating an invoice record in the database, the invoice record comprising charge amounts and their respective usage data;

receiving a request to correct the invoice record from a controlling component of the mobile digital cellular telecommunication system, the request comprising a correction specification of the respective usage data comprised in the invoice record; recovering a complete data volume of the usage data in the record comprising the usage data to be corrected;

after the recovering of the complete data volume of the usage data in the record comprising the usage data to be corrected correcting the usage data in the record comprising the usage data to be corrected, wherein the usage data is corrected according the correction specification;

correcting the charge amount in the record comprising the corrected usage data; after the correcting of the charge amount in the record comprising the corrected usage data executing the following on the record comprising the corrected usage data: the reducing of data volume of the usage data in the record: and generating a corrected invoice record in the database, the corrected invoice record comprising the corrected charge amounts and the corrected usage data wherein the records in the data base comprise respective primary keys and one or more respective secondary keys, wherein the primary keys are used for unique identification of the records in the database and the secondary keys are used for identification of groups of the records in the database, wherein the generating of the charge amounts for the usages of the respective resources is executed for the resources which usage data are comprised in the records comprising one or more of the secondary keys of a first key set;

wherein the invoice record comprises the primary keys comprised in the records comprising one or more of the secondary keys of a second key set, wherein the charge amounts comprised in the invoice record are comprised in the records comprising one or more of the secondary keys of the second key set, and the usage data comprised in the invoice record are comprised in the records comprising one or more of the secondary keys of the second key set;

wherein the corrected invoice record in the database comprises the primary keys comprised in the invoice record, wherein the corrected charge amounts are comprised in the records comprising the primary keys comprised in the invoice record, wherein the corrected usage data are comprised in the records comprising the primary keys comprised in the invoice record; and wherein the reducing of the data volume of the usage data in the record comprises the following: deleting a portion of the usage data in the record in which the volume of the usage data record is to be reduced, the deleted portion being redundant for the generation of the invoice record using the record in which the volume of the usage data record is to be reduced generating an auxiliary record in the database, the auxiliary record being linked by a foreign key relationship with the record in which the volume of the usage data record is reduced and comprising the deleted portion of the usage data; wherein the recovering of complete data volume of the usage data in the record comprises the following:

merging the usage data stored in the record comprising the usage data which data volume of the usage data is to be recovered and in the auxiliary record linked by the foreign key relationship with the record comprising the usage data which data volume of the usage data is to be recovered in the record comprising the usage data which data volume of the usage data is to be recovered and deleting the auxiliary record linked by the foreign key relationship with the record comprising the usage data which data volume of the usage data is recovered.

* * * * *